United States Patent
Chrysanthakopoulos

(10) Patent No.: US 8,630,489 B2
(45) Date of Patent: Jan. 14, 2014

(54) EFFICIENT IMAGE MATCHING

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 12/435,447

(22) Filed: May 5, 2009

(65) Prior Publication Data

US 2010/0284604 A1    Nov. 11, 2010

(51) Int. Cl.
  *G06K 9/46* (2006.01)
  *G06K 9/00* (2006.01)
  *B62D 57/032* (2006.01)

(52) U.S. Cl.
  USPC ........... 382/190; 382/153; 382/165; 382/170; 382/195; 382/218; 382/305; 901/1; 707/706; 707/E17.019

(58) Field of Classification Search
  USPC ......... 382/153, 165, 170, 195, 218, 305, 190; 901/1; 707/706, E17.019–E17.025
  See application file for complete search history.

(56) References Cited

U.S. PATENT DOCUMENTS

| | | | |
|---|---|---|---|
| 7,015,931 B1 | 3/2006 | Cieplinski | |
| 7,043,474 B2 * | 5/2006 | Mojsilovic et al. | 1/1 |
| 7,248,782 B2 * | 7/2007 | Kasutani | 386/241 |
| 7,376,263 B2 * | 5/2008 | Kim et al. | 382/162 |
| 7,400,784 B2 * | 7/2008 | Joly | 382/305 |
| 7,474,759 B2 | 1/2009 | Sternberg et al. | |
| 7,478,091 B2 | 1/2009 | Mojsilovic et al. | |
| 7,493,340 B2 | 2/2009 | Rui | |
| 7,697,792 B2 * | 4/2010 | Keating et al. | 382/305 |
| 2004/0218837 A1 * | 11/2004 | Shiyama | 382/305 |
| 2005/0084154 A1 * | 4/2005 | Li et al. | 382/190 |
| 2007/0031034 A1 | 2/2007 | Rising et al. | |
| 2008/0219503 A1 | 9/2008 | Di Venuto et al. | |
| 2009/0060294 A1 * | 3/2009 | Matsubara et al. | 382/118 |
| 2010/0299355 A1 * | 11/2010 | Shiiyama et al. | 707/769 |
| 2010/0324773 A1 * | 12/2010 | Choi et al. | 701/26 |

OTHER PUBLICATIONS

Osadebey Michael Eziashi, "Integrated Content-Based Image Retrieval using Texture, Shape and Spatial Information", Retrieved at<<http://www.medialab.tfe.umu.se/publications/master_thesis/2006/integrated_content-based_image_retrieval_using_texture,_shape_and_spatial_information.pdf>>, Feb. 2006, pp. 173.

(Continued)

*Primary Examiner* — Matthew Bella
*Assistant Examiner* — Jose M Torres
(74) *Attorney, Agent, or Firm* — Medley, Behrens & Lewis, LLC

(57) ABSTRACT

A system described herein includes a receiver component that receives a first image and a symmetry signature generator component that generates a first global symmetry signature for the image, wherein the global symmetry signature is representative of symmetry existent in the first image. The system also includes a comparer component that compares the first global symmetry signature with a second global symmetry signature that corresponds to a second image, wherein the second global symmetry signature is representative of symmetry existent in the second image. The system additionally includes an output component that outputs an indication of similarity between the first image and the second image based at least in part upon the comparison undertaken by the comparer component.

20 Claims, 9 Drawing Sheets

(56) References Cited

OTHER PUBLICATIONS

Joly, et al. "Content-Based Copy Retrieval Using Distortion-Based Probabilistic Similarity Search", Retrieved at<<http://ieeexplore.ieee.org/stamp/stamp.jsp?arnumber=04066995>>, IEEE Transactions on Multimedia, vol. 9, No. 2, Feb. 2007, pp. 293-306.

Matas J. "Visual Recognition Methods", Retrieved at<<http://cmp.felk.cvut.cz/~matas/papers/matas-habil05.pdf>>, May 2005, pp. 1-81.

Stewenius, et al. "Center for Visualization & Virtual Environments", Retrieved at<<http://www.vis.uky.edu/~stewe/ukbench/>>, IEEE Conference on Computer Vision and Pattern Recognition (CVPR), vol. 2, Jun. 2006, pp. 1-3.

* cited by examiner

EFFICIENT IMAGE MATCHING

BACKGROUND

The advent of computing technology in general and image capturing technologies in particular have allowed numerous images to be captured and analyzed for different applications. One exemplary application is image matching, wherein an image is analyzed to ascertain whether it corresponds to one of a plurality of previously captured images. For instance, image matching applications can be used in connection with facial recognition applications amongst other image matching applications.

A considerable amount of research has been undertaken in the field of image matching. Conventionally, algorithms that perform image matching are designed to be as invariant as possible. That is, if a first image is compared to a second image, wherein both images are of the same scene but under different conditions (lighting, angle, distance, etc.), the image matching algorithm is designed to determine that the two images are of the same scene. These image matching algorithms are typically designed to be invariant with respect to a variety of factors such as scale, orientation and lighting.

Many of the currently used image matching systems/methods are based on features that are extracted from images, wherein a feature is representative of a relatively small portion of a captured image. For instance, a feature may be an edge of a table in an image or some other suitable feature that can be extracted by conventional feature extraction algorithms. Often, the feature extraction algorithm analyzes 6×6 matrices of pixels, and the image is scanned using windows of such size. Some feature extraction algorithms analyze intensity gradients in the defined window of pixels and, where a strong intensity gradient is located, a feature is deemed to have been found.

Once a plurality of features are extracted from an image (e.g., in the order of 200 features that are often described using 256 bytes or more), the extracted features are essentially compared with features extracted from other images to ascertain whether there is a correlation between the image and another image. Again, the comparison algorithms are configured to be invariant with respect to various parameters of the image such that a first image can be found to correlate with a second image without features extracted from the first and second images being identical matches. While several advances have been made in the field of image matching using feature comparison techniques, it is to be understood that comparing features can be computationally expensive, particularly if features extracted from an image are compared to features extracted from images in a relatively large image set.

SUMMARY

The following is a brief summary of subject matter that is described in greater detail herein. This summary is not intended to be limiting as to the scope of the claims.

Described herein are various technologies pertaining to image matching in general and, more particularly, to systems, methods, algorithms, etc. for using a hierarchical approach to perform image matching. For example, an image can be received, wherein the image is a digital image that may be obtained through use of a digital camera, use of a scanning device, or other suitable means. The received image can be analyzed and a global signature can be generated for the received image, wherein the global signature is representative of an entirety of the image. For instance, the global signature may be 256 bytes or less. In a first example, a global signature may be based at least in part upon a plurality of features that are extracted from the received image by way of any suitable feature extraction technique. As noted above, a feature is representative of a portion of an image but not an entirety of an image. The global signature based at least in part upon the features can be generated by obtaining an average of corresponding entries in a feature vector and placing such averages in a vector labeled as a global signature. In another example, standard deviations can be calculated for each corresponding entry of the plurality of feature vectors extracted from the image, thereby creating a global signature. In still another example, these two global signatures that are based upon the extracted features can be combined (e.g., can be appended to one another to create a vector or combined to create a matrix).

In another example, a global signature can be generated that is based at least in part upon colors existent in the received image. For instance, the second global signature may be based at least in part upon a color histogram of the received image. In a detailed example, the received image can be converted to a YCbCr color space, and a histogram of pixel intensity distributions in each color channel can be generated. Such histogram can be used as a global signature that describes an entirety of the image to be generated.

In still yet another example, a global signature of the received image can be generated that is based at least in part upon symmetries existent in the received image. For instance, the received image can be divided into a certain number of cells, and opposing pixels in vertical and horizontal directions in each cell can be compared. Additionally or alternatively, cells can be compared with one another. Based at least in part upon such comparisons, values pertaining to symmetries in and/or between the cells can be generated and used together to create a global signature that is representative of the entirety of the received image.

Once one or more global signatures have been generated from the received image, such global signature(s) can be compared to global signature(s) that correspond to a plurality of other images in an image set. A threshold number of images may be located that most closely match the received image based at least in part upon the comparison of global signatures described above. The located threshold number of images may then be compared with the received image using conventional feature comparison techniques. Since feature comparison is undertaken on a relatively small set of images, the time needed to perform image matching is greatly reduced without compromising quality of image matching.

Other aspects will be appreciated upon reading and understanding the attached figures and description.

DETAILED DESCRIPTION

Figure 1:
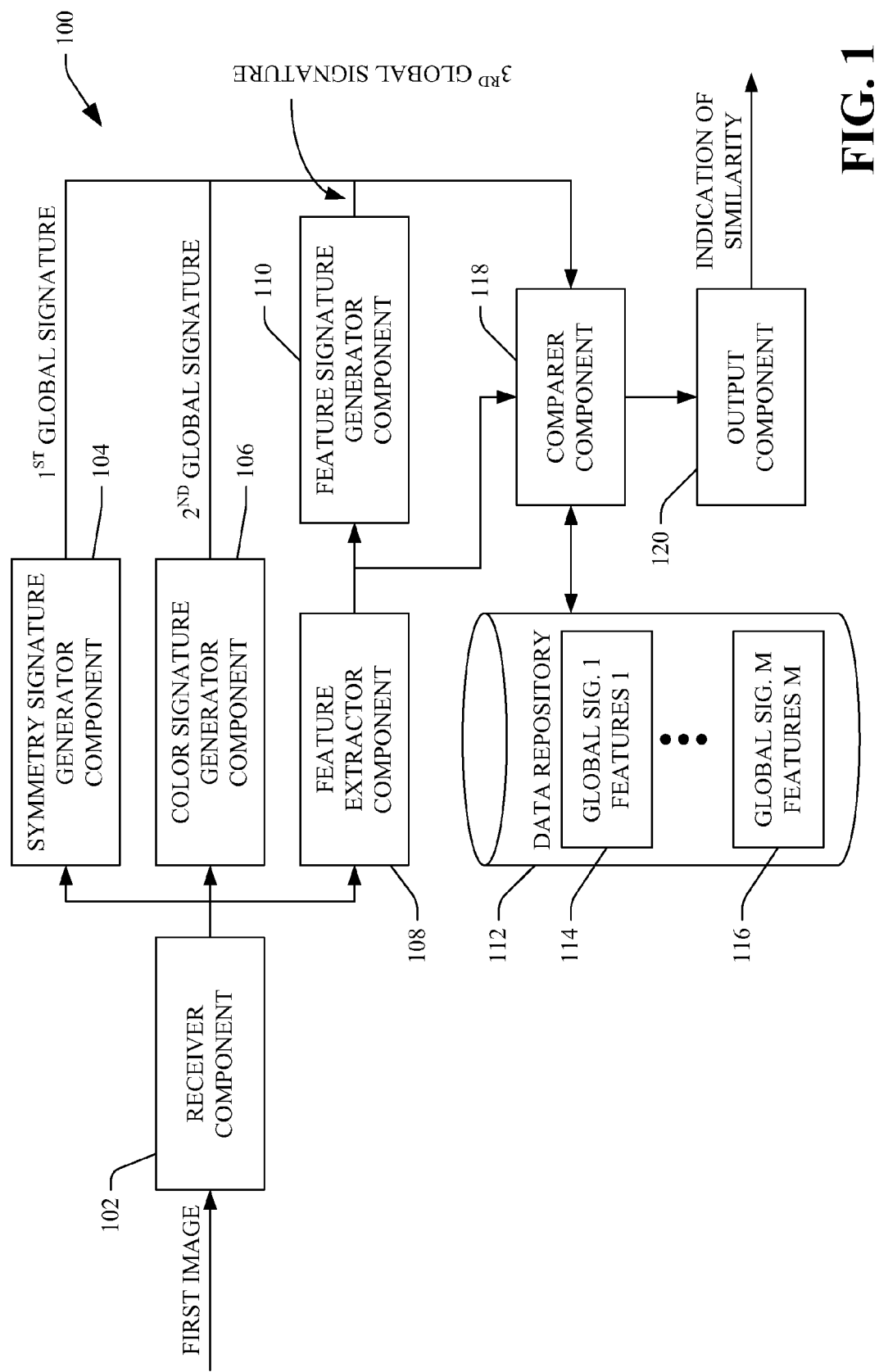
FIG. 1 is a functional block diagram of an example system that facilitates determining whether a received image corresponds to an image in an image set.

Various technologies pertaining to image matching will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates image matching by way of a hierarchical image matching approach is illustrated. The system 100 includes a receiver component 102 that is configured to receive a first image. For instance, the receiver component 102 may receive the first image from a digital camera, a data repository, a scanner, etc. The system 100 also includes a symmetry signature generator component 104 that generates a first global signature for the first image received by the receiver component 102. A color signature generator component 106 can generate a second global signature for the first image received by the receiver component 102. As used herein, a global signature refers to a signature that describes an entirety of an image.

The system 100 may also include a feature extractor component 108 that extracts features from the first image, wherein a feature is a representation of a portion of an image. In an example, a feature extracted by the feature extractor component 108 may be in the form of a vector and may represent/describe a portion of an image (the first image received by the receiver component 102). Of course, features extracted by the feature component may additionally or alternatively be in the form of a matrix or other suitable data structure. The feature extractor component 108 can extract multiple features from the first image. A feature signature generator component 110 can be in communication with the feature extractor component 108 and can generate a third global signature based at least in part upon features extracted by the feature extractor component 108. Generation of the first, second and third global signatures will be described in greater detail herein.

The system 100 also includes a data repository 112 that can retain a plurality of global signatures and features that correspond to a plurality of images. For instance, the data repository 112 can retain a first data set 114 that corresponds to a second image. The first data set 114 can include at least one global signature that is representative of an entirety of the second image. The first data set 114 can also comprise a plurality of features that correspond to the aforementioned second image. That is, each of the plurality of features describes/represents a portion of the second image that corresponds to the first data set 114. As shown, the data repository 112 can include the first data set 114 through an Nth data set 116, wherein the Nth data set corresponds to another image and includes a global signature that represents such image and a plurality of features that represent such image.

A comparer component 118 can receive at least one of the first global signature, the second global signature or the third global signature generated by the symmetry signature generator component 104, the color signature generator component 106, and the feature signature generator component 110, respectively. The comparer component 118 can compare the at least one global signature with corresponding global signatures in the data repository 112. The comparer component 118 can undertake such comparison in connection with determining/locating a threshold number of images that most closely match the first image received by the receiver component 102.

Once the comparer component 118 has determined which images in an image set most closely match the received first image based upon the comparison of global signatures, the comparer component 118 can compare the features extracted by the feature extractor component 108 with features in the data sets corresponding to the determined/located threshold number of images. Based upon this granular comparison between features of the first image and features of the determined/located threshold number of images in the image set, the comparer component 118 can determine which image or images most closely match the received first image. An output component 120 can be in communication with the comparer component 118 and can output an indication of similarity with respect to at least one image in the image set as compared to the first image. This indication of similarity can be displayed on a display screen, output to a data repository, etc. In another example, the indication of similarity can cause a mechanical device to operate in a particular manner. For instance, a mobile robotic device may desirably navigate based upon image analysis and can move in a certain direction or in a certain manner based at least in part upon the indication of similarity output by the output component 120.

More detail with respect to generating global signatures will now be described. As noted above, the symmetry signature generator component 104 can receive the first image and generate a first global signature that is representative of an entirety of the first image. The first global signature can be representative of symmetries existent in the first image. For example, the symmetry signature generator component 104 can partition the first image into a plurality of partitions. The symmetry signature generator component 104 can, for each partition, analyze pixels in the horizontal and vertical direction to ascertain whether symmetries exist and what level of symmetries exist in the vertical portions of each partition and the horizontal portions of each partition. A value indicative of an amount of vertical symmetry in a particular partition and a value indicative of horizontal symmetry in a first partition may be generated by the symmetry signature generator component 104 and stored as one or more entries in a global signature vector. For instance, the symmetry signature generator component 104 can output a value of 0 if there is found to be no symmetry or a minimal amount of symmetry in a certain direction in a partition and can output a value of 10 if there is perfect symmetry in a particular direction with respect to a partition of the first image.

Again, in an example, if the symmetry signature generator component 104 partitioned the first image into 25 partitions, the symmetry signature generator component 104 can output a global signature in the form of a vector with 50 entries. Of course, the symmetry signature generator component 104 can generate global signatures for each image in a data set. Accordingly, the comparer component 118 can compare the global signature output by the symmetry signature generator component 104 for the first image with global signatures of a plurality of other images in the image set.

Additionally or alternatively, the symmetry signature generator component 104 can output symmetry values between partitions (rather than within partitions). Thus, for instance, the symmetry signature generator component 104 can output symmetry values between a cell on one side of an image and a cell on an opposite side of the image. Other symmetries are also contemplated and are intended to fall under the scope of the hereto-appended claims.

The symmetry signature generator component 104 can output values of symmetry based upon one or more factors. For instance, the symmetry signature generator component 104 can output symmetry values based upon symmetries in pixel intensities in partitions of images. In another example, the symmetry signature generator component 104 can output symmetry values based upon symmetries in color hues in partitions of images. The symmetry signature generator component 104 can thus use any suitable parameter or combination of parameters when generating the first global signature of the first image.

As noted above, the color signature generator component 106 can output a second global signature that is representative of an entirety of the first image. Pursuant to an example, the color signature generator component 106 can convert the first image to the YCbCr color space and can further create a histogram of pixel intensity distributions in each color channel. The histograms for each color channel can be appended to one another to generate the second global signature. Pursuant to an example, the color signature generator component 106 can generate the second global signature such that it is of a size between 140 and 200 bytes that can describe an entirety of the first image (e.g., which may be in the order of one megapixel or higher). Again, the color signature generator component 106 can additionally be used to generate global signatures for a plurality of images in an image set such that the comparer component 118 can compare the second global signature of the first image with corresponding global signatures of a plurality of other images.

With respect to the feature signature generator component 110, such component 110 can receive a plurality of features extracted by the feature extractor component 108 and can generate the third global signature based at least in part upon the plurality of extracted features. The feature extractor component 108 can be configured to extract features of a uniform length. That is, the feature extractor component 108 can be configured to analyze the first image and output multiple feature vectors corresponding to the first image, wherein length of each feature vector is uniform. Each feature vector received by the feature signature generator component 110 may be of any suitable size, such as 36 bytes, 128 bytes, 256 bytes, etc. Furthermore, the feature extractor component 108 can generate any suitable number of features with respect to the first image. For example, the feature extractor component 108 can output 30 feature vectors, 70 feature vectors, etc. for the first image.

The feature signature generator component 110 can receive such feature vectors output by the feature extractor component 108 and can compute an average value for each element of the feature vectors. Thus, the third global signature generated by the feature signature generator component 110 can include a vector, wherein the elements of such vector are average values of corresponding elements in feature vectors output by the feature extractor component 108. In another example, the feature signature generator component 110 can output the third global signature such that the third global signature includes a vector with a plurality of elements, wherein each element is a standard deviation of corresponding elements in the feature vectors output by the feature extractor component 108. In still yet another example, the third global signature can include a vector that includes the average values of elements of features output by the feature extractor component 108 and a vector that includes the standard deviations of elements in the features output by the feature extractor component 108. Thus, the third global signature may be a matrix that describes/represents an entirety of the first image. In another example, the third global signature may be a vector of twice the length of the feature vectors output by the feature extractor component 108 (e.g., the vector corresponding to the first moment appended to the vector corresponding to the second moment across each element of the feature vectors).

As noted above, the comparer component 118 can then compare at least one of the global signatures output by the symmetry signature generator component 104, the color signature generator component 106, or the feature signature generator component 110, respectively, with corresponding global signatures in the data repository 112. When comparing the global signatures, the comparer component 118 can use the sum of squared errors in connection with ascertaining which images in the image set most closely match the first image received by the receiver component 102. Of course, other techniques for comparing the global signatures are contemplated and intended to fall under the scope of the hereto appended claims. Furthermore, it is to be understood that other global signatures may be used in connection with determining which image in an image set most closely matches a particular image.

The system 100 may be used in a variety of applications. For example, the system 100 may be placed in a robotic device that uses image matching for navigation. In another example, the system 100 may be used in connection with performing facial recognition. For example, the system 100 may be placed in an automated teller machine (ATM) and used to verify an identity through use of facial recognition. The system 100 may also be placed in a security setting to monitor a certain product and/or location. One skilled in the art will recognize and appreciate that the system 100 may be used in other image matching applications.

Additionally, any suitable hardware may be used in connection with feature extraction, global signature generation, global signature comparison, and/or feature comparison. For example, a general purpose processor may be used in connection with performing feature extraction, global signature generation, global signature comparison, and/or feature comparison. In another example, a graphics processing unit (GPU) may be used in connection with performing feature extraction, global signature generation, global signature comparison, and/or feature comparison. Similarly, an integrated circuit or other suitable hardware may be used in connection with performing one or more of the aforementioned tasks.

Figure 2:
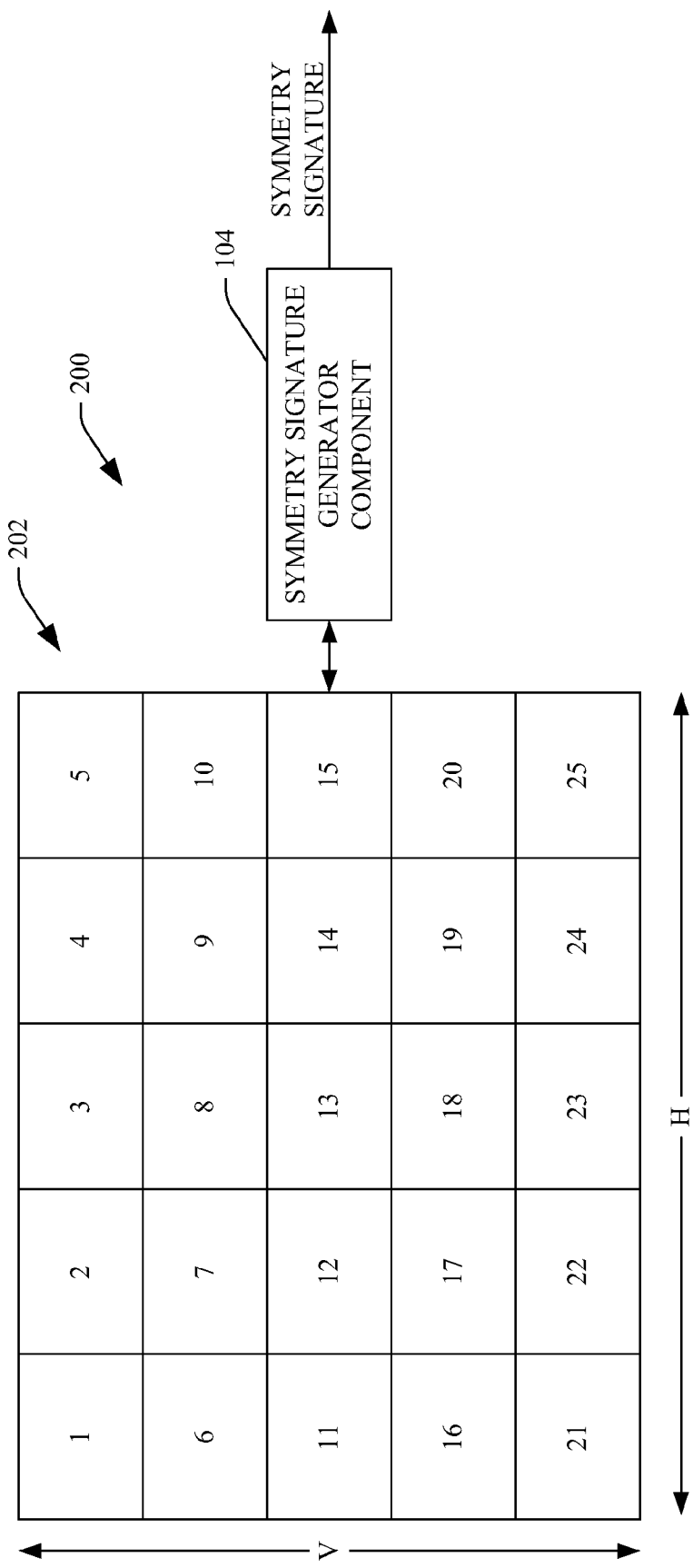
FIG. 2 is a functional block diagram of an example system that facilitates generating a symmetry signature for an image.

Referring now to FIG. 2, an example system 200 that facilitates generating a global signature that is representative of symmetries in a digital image is illustrated. The system 200 includes the symmetry signature generator component 104 that receives an image 202. As can be ascertained by reviewing FIG. 2, the symmetry signature generator component 104 partitions the image 202 into a plurality of partitions. As shown, the symmetry signature generator component 104 has partitioned the image 202 into 25 partitions. It is to be understood, however, that the symmetry signature generator component 104 can partition an image into any suitable number of partitions.

For each partition or combination of partitions, the symmetry signature generator component 104 can determine what level of symmetry exists in the partition in one or more directions. For example, the image 202 can have a horizontal direction H and a vertical direction V. The symmetry signature generator component 104 can, for each partition, output an indication of an amount of symmetry in a horizontal direction and/or a vertical direction. It is to be understood that the symmetry signature generator component 104 may also be configured to output an indication of an amount of symmetry in diagonal directions of one or more partitions of the image 202.

The symmetry signature generator component 104 can determine an amount of symmetry by analyzing pixels in each partition, wherein the amount of symmetry may depend upon intensity corresponding to pixels, colors of pixels in the partition, etc. Symmetry values for the partitions may then be placed in a vector and output by the symmetry signature generator component 104 as a symmetry signature (e.g., a global signature that is representative of the entirety of the image). As noted above, symmetry values can also be generated between partitions (e.g., between partition 1 and partition 25, between partition f1 and partition 5, . . . ).

Figure 3:
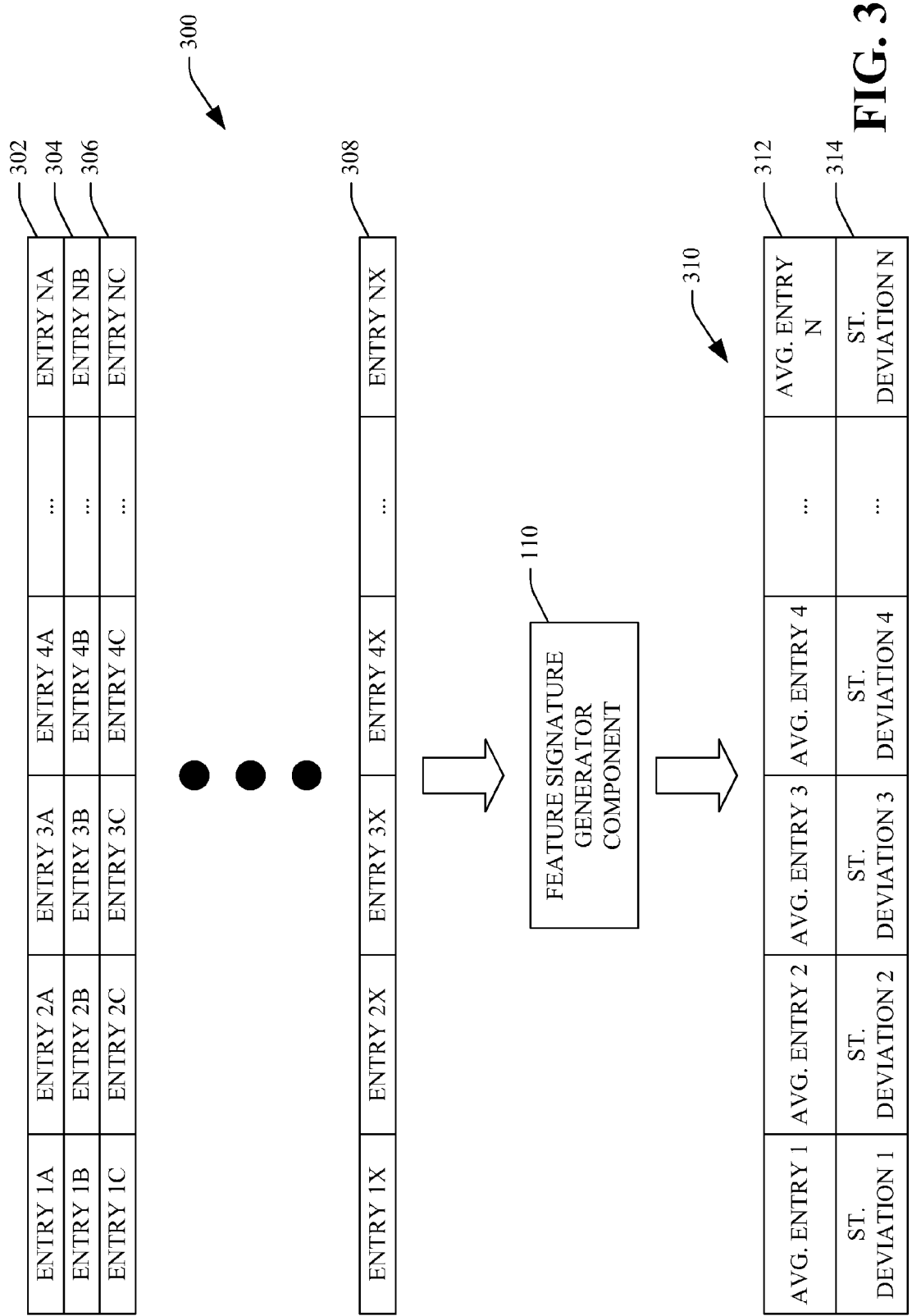
FIG. 3 is a functional block diagram of an example system that facilitates generating a global signature based on features extracted from an image.

With reference now to FIG. 3, an example depiction 300 of operation of the feature signature generator component 110 is illustrated. As described above, the feature extractor component 108 (not shown) can extract a plurality of features with respect to an image. For example, the feature extractor component 108 for a particular image may extract X features, where X is an integer greater than 1. As shown in FIG. 3, the feature extractor component 108 can extract a first feature 302, a second feature 304, a third feature 306 through an Xth feature 308. Each of the features extracted by the feature extractor component 108 may be in the form of a vector. For instance, each vector output by the feature extractor component 108 may have uniform length. In the example depicted in FIG. 3, each of the features 302-308 are vectors with N entries, where N is an integer greater than one. In a detailed example, each feature vector may have 36 entries, 128 entries, 256 entries or any other suitable number of entries. Thus, any suitable feature extracting algorithm/component can be used in connection with extracting features of images.

The feature signature generator component 110 receives the features 302-308 extracted by the feature extractor component 108 from an image. Based at least in part upon the received features 302-308, the feature signature generator component 110 can generate a global feature signature 310 that is representative of an entirety of the image. Pursuant to an example, the global signature 310 may include a first vector 312 that includes N entries, wherein each entry of the vector 312 is an average of corresponding entries of the received features 302-308. The global signature 310 may also include a second vector 314, wherein each entry of the second vector 314 is a standard deviation of corresponding entries in the features 302-308. Thus, for instance, the global signature 310 may be in the form of a 2×N matrix. In another example, the global signature 310 may be a vector of length 2N, wherein the second vector 314 is appended to the first vector 312 to create the global signature 310. As noted above, the comparer component 118 can compare such global signature 310 with other corresponding global signatures of images in an image set.

Figure 4:
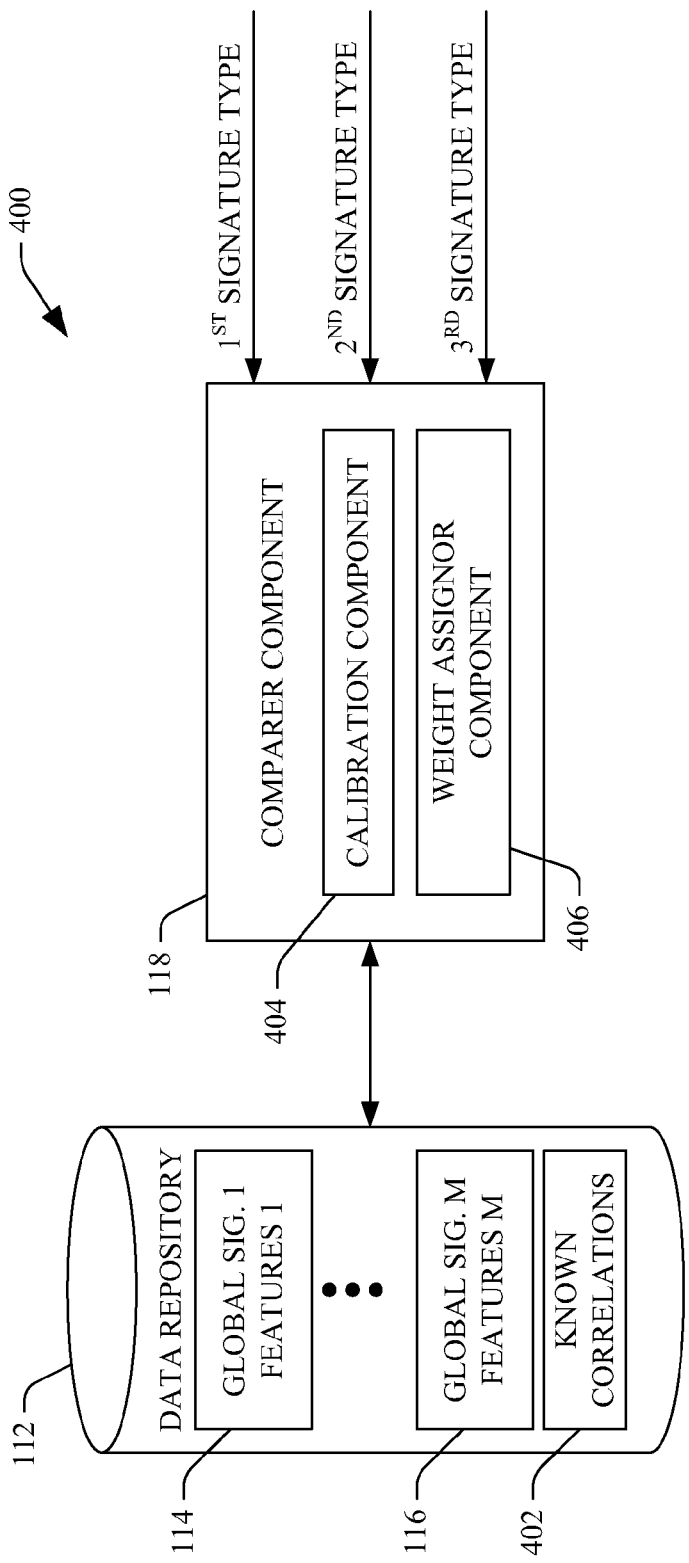
FIG. 4 is a functional block diagram of an example system that facilitates automatically calibrating an image matching system.

Now referring to FIG. 4, an example system 400 that facilitates automatically calibrating the comparer component 118 is illustrated, wherein the system 400 can be used in connection with assigning weights to types of global signatures to optimize comparison of global signatures. The system 400 includes the comparer component 118 that receives global signatures pertaining to an image and compares such global signatures with corresponding global signatures of other images in an image set. For example, the system 400 includes the data repository 112 that retains the data packets 114-116, which correspond to images in an image set. The data repository 112 can also include known correlations 402 between images. That is, images in the image set can be labeled such that it is known a priori which images correspond to one another.

The comparer component 118 can be configured to receive global signatures of various types. For instance, a first type of global signature may correspond to symmetries existent in an image, a second type of global signature may correspond to colors existent in the image, and a third type of global signature may correspond to a global signature that is based at least in part upon features extracted from the image. Other types of global signatures are also contemplated. Depending on the scene captured in images in the image set, it may be desirable to provide different weights to the different types of global signatures. For instance, with respect to outdoor scenes, it may be desirable to provide more weight to the type of global signature that represents colors existent in the image than a type of global signature that represents symmetries existent in the image. For indoor settings, whoever, it may be desirable to provide a greater weight to a type of global signature that is based on extracted features than weight provided to a type of global signature that are representative of colors existent in the image.

The comparer component 118 can include a calibration component 404 that automatically determines which weight should be provided to types of global signatures to optimize comparison accuracy for a particular image set. For example, initially the types of global signatures can be weighted equally. The calibration component 404 may then select a first image from the image set and the comparer component 118 can undertake a comparison of global signatures pertaining to the selected image and global signatures of images in the data set. For example, the comparer component 118 can compare the global signatures of the selected image with global signatures corresponding to each image in the image set. As the data repository includes known correlations 402, accuracy of the comparison undertaken by the comparer component 118 for the entirety of the image set can be ascertained.

The comparer component 118 also includes a weight assigner component 406 that assigns weights to the different types of global signatures. For instance, the weight assigner component 406 can increase a weight assigned to a first type of global signature while maintaining (not adjusting) the weight assigned to other types of global signatures. The comparer component 118 may then perform another comparison of images in the image set with other images in the image set to determine accuracy of the comparison using the updated weights. This process can be iterated until an optimal weight assigned to each type of global signature is ascertained.

As noted above, calibration of weights may be undertaken for different types of image sets. For instance, a first image set may include images of an outdoor scene while a second image set may include images of indoor scenes. The calibration component 404 may determine that different weights are desirably used for different scenes. That is, the comparer component 118 can be calibrated depending upon an image set that is of interest.

Figure 5:
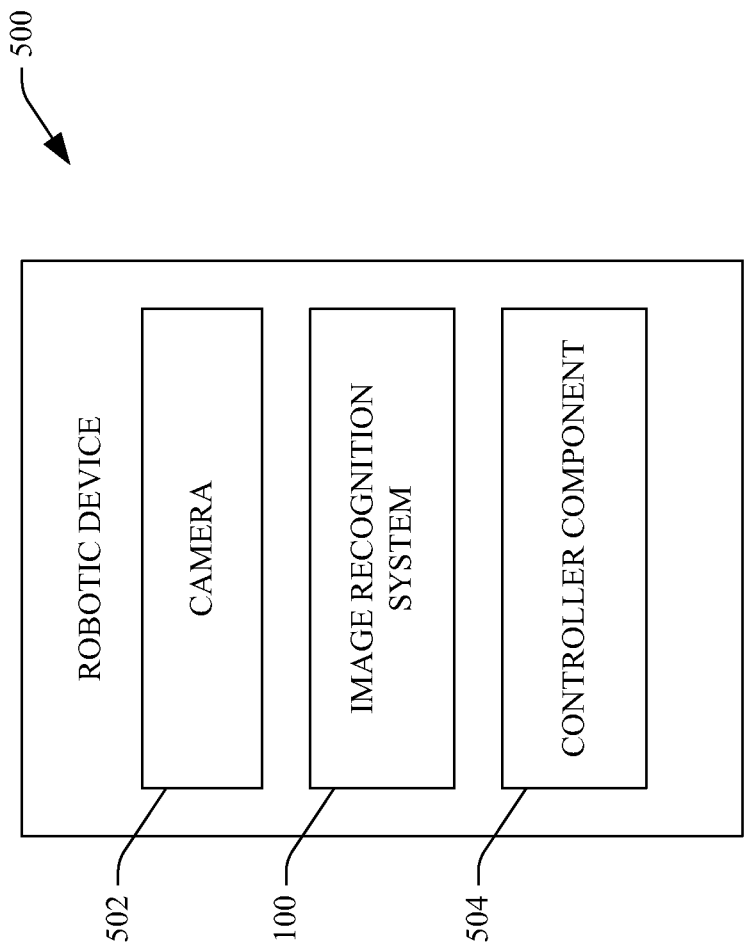
FIG. 5 is a functional block diagram of an example system that facilitates automatically controlling a robot based at least in part upon matching of images.

Turning now to FIG. 5, an example robotic device 500 that uses an image matching system as described herein is illustrated. The robotic device 500 includes a digital camera 502. In an example, the digital camera 502 may be configured to capture images of one megapixel or greater.

The robotic device 500 also includes the image recognition system 100 described above. The robotic device 500 may also include a processor, buses and other hardware that can be used in connection with implementing the image recognition system. Pursuant to an example, the robotic device 500 may include a general purpose processor, a graphics processing unit or other suitable processor or integrated circuit. In another example, an image captured by the robotic device 500 through use of the camera 502 can be provided to the image recognition system 100, which can determine which image in an image set most closely matches the image captured by the camera 502.

The robotic device 500 further includes a controller component 504 that causes the robotic device to act based at least in part upon the output of the image recognition system 100. For instance, the controller component 504 can control motion of the robotic device 500, and thus may cause the robotic device 500 to move in a particular direction based upon output of the image recognition system 100. For example, the controller component 504 can use the output of the image recognition system 100 to determine location of the robotic device 500 and can cause the robotic device 500 to move based at least in part upon the determined location. Furthermore, the controller component 504 can determine orientation of the robotic device 500 based at least in part upon output of the image recognition system 100.

The robotic device 500 may be or include any suitable robotic device. For example, the robotic device 500 may be or be included in a lawnmower that is configured to automatically cut grass in a certain region. In another example, the robotic device 500 may be or be included in a vacuum cleaner that is configured to vacuum certain areas of a floor. In other examples the robotic device 500 may be included in more sophisticated devices such as in an airplane in connection with an autopilot function, in a rail system that can be used in connection with recognizing hazards along a railway or location of rail stops, in an automobile to inform an occupant thereof of particular landmarks in the field of view of a camera, etc. Other applications are also contemplated and intended to fall under the scope of the hereto appended claims. For example, the image recognition system 100 may be used in any suitable application where image matching is desirable.

Figure 6:
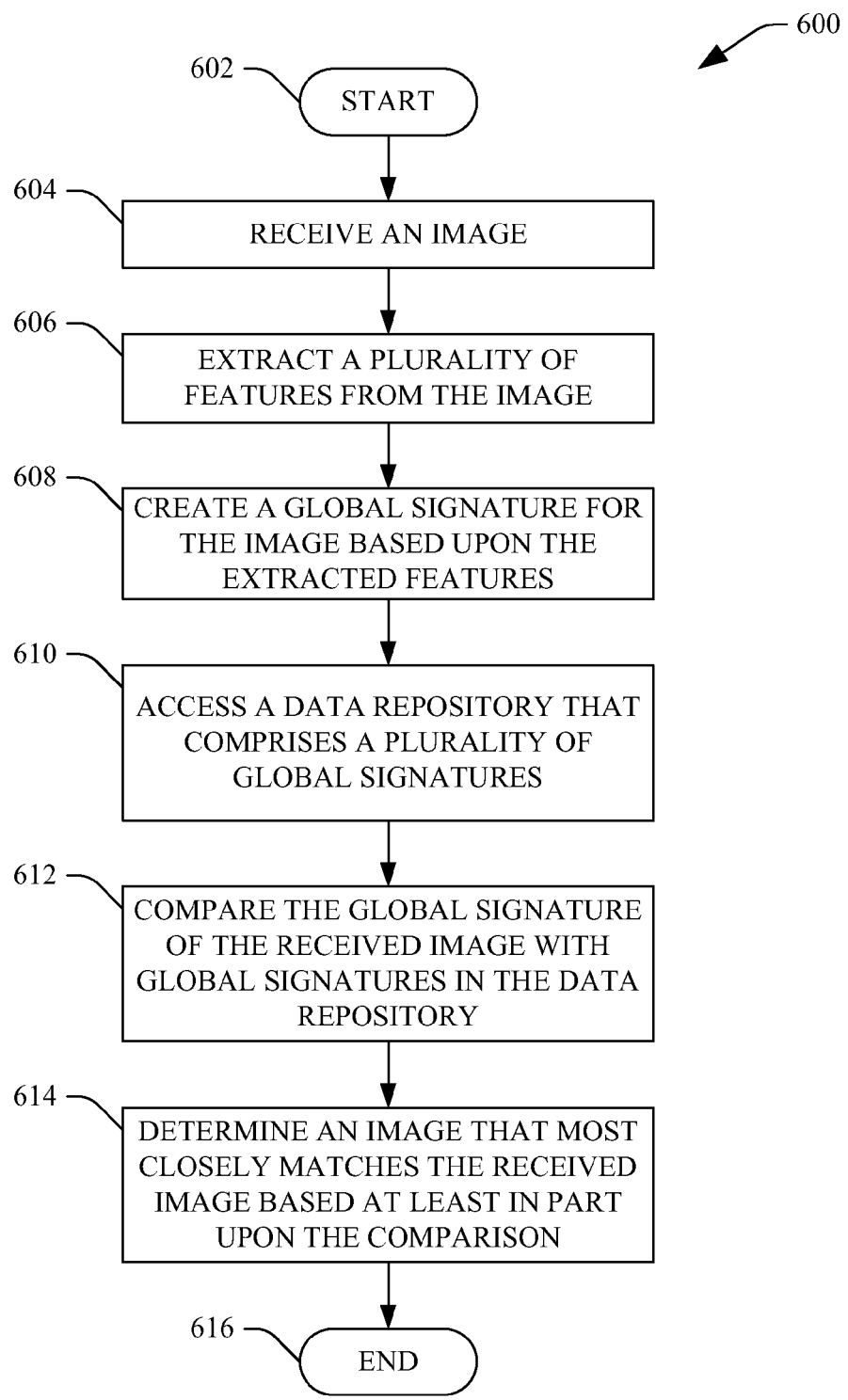
FIG. 6 is a flow diagram that illustrates an example methodology for performing image matching.
Figure 7:
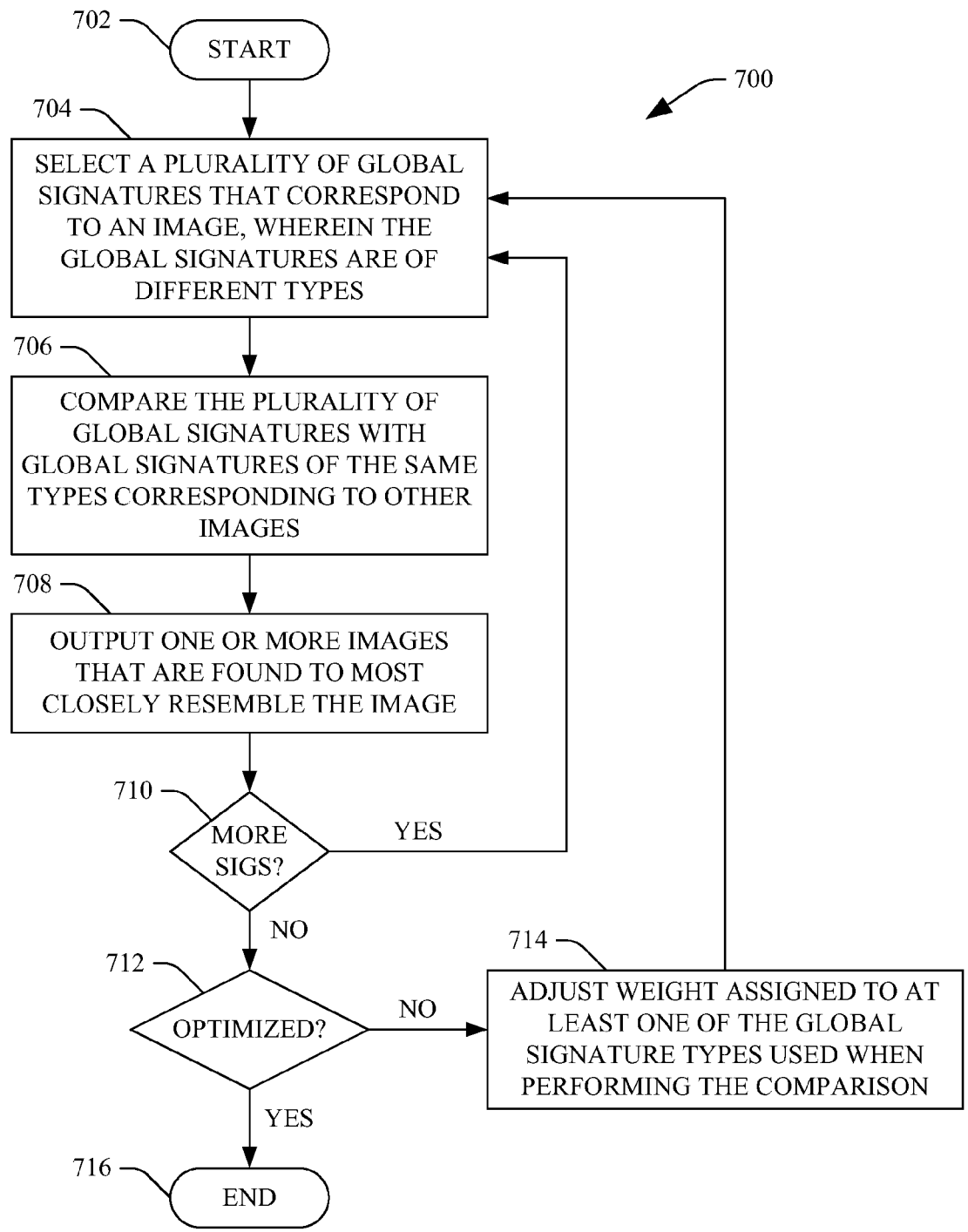
FIG. 7 is a flow diagram that illustrates an example methodology for automatically calibrating an image matching algorithm.
Figure 8:
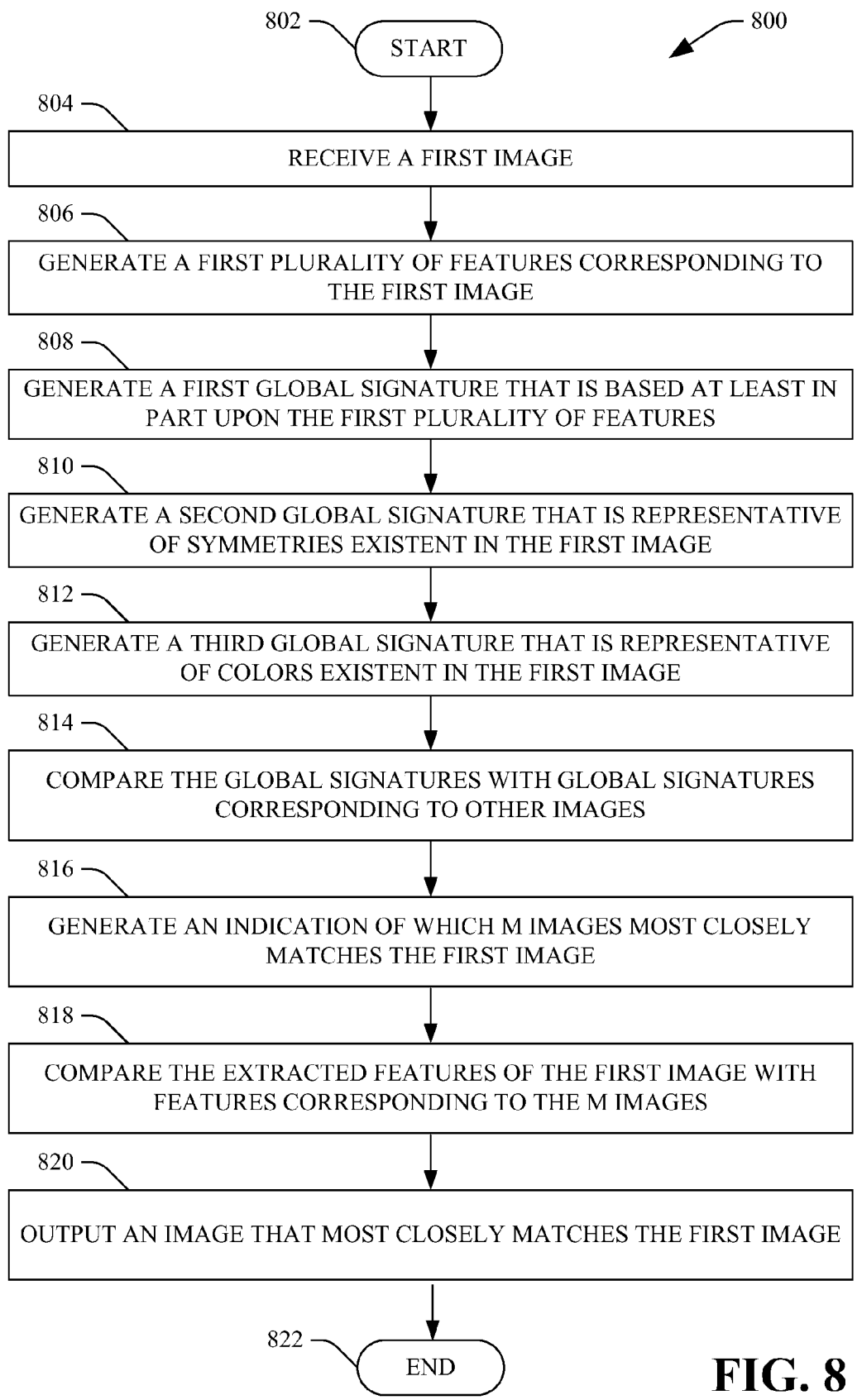
FIG. 8 is a flow diagram that illustrates an example methodology for performing image matching.

With reference now to FIGS. 6-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates image matching is illustrated. The methodology 600 begins at 602, and at 604 an image is received. The image can be received from a computer readable medium, from a digital camera, from a scanner or other suitable device.

At 606, a plurality of features are extracted from the image received at 604. As noted above, a feature may be in the form of a vector and may represent a relatively small portion of the received image.

At 608, a first global signature for the image received at 604 is created based at least in part upon the plurality of features extracted from the image at 606. As noted above, a global signature can be representative of an entirety of the image. In an example, the first global signature can be created by generating first and second moments with respect to corresponding entries of the feature vectors extracted at 606.

At 610, a data repository is accessed, wherein the data repository comprises a first plurality of global signatures that are representative of a corresponding plurality of images. Thus, an image can have at least one global signature that is representative thereof.

At 612, the first global signature created at 608 is compared with the first plurality of global signatures retained in a data repository. For instance, the comparison may be a weighted comparison, wherein a global signature of a particular type is assigned a weight that is empirically determined to optimize image matching. Thus, the act of comparing can take into consideration weights assigned to global signatures.

At 614, a determination is made that an image in an image set represented by the global signatures in the data repository most closely matches the image received at 604, wherein the determination is based at least in part upon the comparison undertaken at 612. The image that is found to most closely match the image received at 604 can be output to a display screen, can be used in connection with automating movement of a robotic device, etc. The methodology 600 completes at 616.

Now referring to FIG. 7, an example methodology 700 for calibrating an image matching algorithm when comparing global signatures is illustrated. The methodology starts at 702, and at 704 a plurality of global signatures that correspond to an image are selected, wherein the global signatures are of different types. For instance, a first type of global signature may be representative of symmetries existent in an image, a second type of global signature may be representative of colors existent in an image, and a third type of global signature may represent features extracted from an image. Of course other types of global signatures are also contemplated.

At 706, the plurality of global signatures is compared with global signatures of the same types corresponding to other images. Thus, a first, second and third global signature of first, second and third types, respectively, corresponding to an image can be compared with global signatures of the first, second and third types of a plurality of other images in an image set.

At 708, one or more images that are found to most closely resemble the image selected at 704 is output. The image set can be labelled such that it is known beforehand which images should most closely match the image selected at 704. Thus, accuracy of the image matching can be analyzed.

At 710, a determination is made regarding whether each set of global signatures corresponding to an image have been compared against global signatures corresponding to other images in the data set. If there are more global signatures to analyze, then the methodology returns to 704 where another plurality of global signatures of different types with respect to an image are selected for use in comparison against other global signatures that correspond to images in the image set. If there are no more global signatures to analyze, then at 712 a determination is made regarding whether weights assigned to different types of global signatures have been optimized. That is, weights assigned to global signatures can be changed to facilitate improved accuracy when performing image matching. If the weights have not been optimized, then at 714 weights assigned to at least one of the types of global signatures is adjusted, wherein such weights are used when performing the comparison at 706. Once the weight has been adjusted at 714, the methodology 700 can return to 704 where global signatures of different types with respect to an image are selected and compared against global signatures corresponding to other images in the data set. Once an optimized weight has been ascertained, the methodology 700 completes at 716.

While the methodology 700 has been shown to calibrate weights assigned to global signature types through an iterative process, it is to be understood that calibration can be undertaken using any suitable technique including but not limited to machine learning, such as Bayesian networks, artificial neuron networks, etc.

Turning now to FIG. 8, an example methodology 800 that facilitates performing image matching is illustrated. The methodology 800 starts at 802, and at 804 a first image is received. At 806, responsive to receipt of the first image, a first plurality of features corresponding to the first image are generated. Such features may be in the form of a vector of uniform length.

At 808, a first global signature is generated, wherein the first global signature is based at least in part upon the first plurality of features. At 810, a second global signature is generated, wherein the second global signature is representative of symmetries existent in the first image (e.g., based at least in part upon symmetries in the first image). At 812, a third global signature is generated, wherein the third global signature is based at least in part upon colors existent in the first image received at 804.

At 814 the first, second, and third global signatures are compared with corresponding global signatures in a data repository, wherein the corresponding global signatures pertain to images in an image set. At 816, an indication is generated regarding a subset of images (e.g., which M images) in the image set most closely match the first image. For instance, M may be less than an entirety of images in the data set.

At 818, the extracted features of the first image (generated at 806) are compared with features corresponding to the subset of images. At 820, an image in the subset of images that most closely matches the first image is output. Output of such image may include output of an identity of the image, outputting of an indication that represents the image, etc. The methodology 800 completes at 822.

Figure 9:
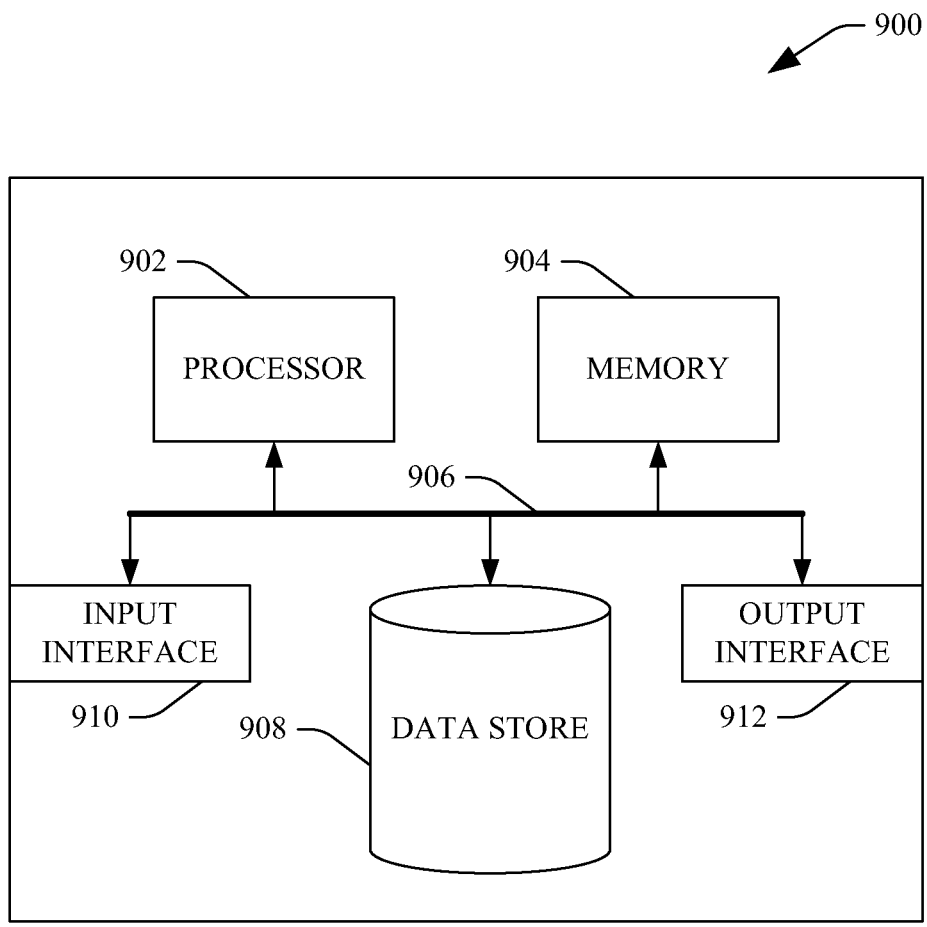
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports image matching. In another example, at least a portion of the computing device 900 may be used in a system that supports calibrating an image matching system. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store global signatures of images, features extracted from images, images themselves, etc.

The computing device 900 additionally includes a data store 908 that is accessible by the processor 902 by way of the system bus 906. The data store 908 may include executable instructions, images, global signatures, features, etc. The computing device 900 also includes an input interface 910 that allows external devices to communicate with the computing device 900. For instance, the input interface 910 may be used to receive instructions from an external computer device, from a robotic device, from a human being, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving an image;
   extracting a plurality of features from the image, wherein a feature is a representation of a portion of an image;
   creating a first global signature of the image based at least in part upon the plurality of features extracted from the image, wherein a global signature is a representation of an entirety of an image;
   accessing a data repository that comprises a first plurality of global signatures that are representative of a corresponding plurality of images;
   comparing the first global signature with the first plurality of global signatures in the data repository;
   identifying a subset of images from the plurality of images based upon the comparing of the first global signature with the first plurality of global signatures, wherein a number of images in the subset of images is less than a number of images in the plurality of images;
   subsequent to the identifying of the subset of images from the plurality of images, comparing the plurality of features extracted from the image with a plurality of features that correspond to the subset of images;
   determining that a first image in the subset of images most closely matches the image based at least in part upon the comparing of the first global signature with the first plurality of global signatures and the comparing of the plurality of features extracted from the image with the plurality of features that correspond to the subset of images;
   outputting an indication that the first image most closely matches the image.

2. The method of claim 1, further comprising:
   generating a second global signature responsive to receipt of the image, wherein the second global signature is representative of symmetry in the image;
   comparing the second global signature with a second plurality of global signatures retained in the data repository, wherein the second plurality of global signatures are representative of the corresponding plurality of images, wherein the second plurality of global signatures are representative of symmetries in the plurality of images; and identifying the subset of images from the plurality of images based at least in part upon the comparing of the second global signature with the second plurality of global signatures.

3. The method of claim 2, further comprising:

generating a third global signature responsive to receipt of the image, wherein the third global signature is representative of colors existent in the image;

comparing the third global signature with a third plurality of global signatures retained in the data repository, wherein the third plurality of global signatures are representative of the corresponding plurality of images, wherein the third plurality of global signatures are representative of colors existent in the plurality of images; and identifying the subset of images from the plurality of images based at least in part upon the comparing of the third global signature with the third plurality of global signatures.

4. The method of claim 3, wherein the third global signature is a color histogram and the third plurality of global signatures are color histograms.

5. The method of claim 1, wherein the plurality of features extracted from the image are vectors that comprise N entries.

6. The method of claim 5, wherein the first global signature comprises a first vector that comprises N entries, wherein each of the entries in the first vector is an average value of corresponding entries in the plurality of features extracted from the image.

7. The method of claim 5, wherein the first global signature comprises a second vector that comprises N entries, wherein each of the entries in the second vector is a standard deviation of values in corresponding entries in the plurality of features extracted from the image.

8. The method of claim 1, further comprising:

generating a plurality of global signatures that are representative of the image, wherein each of the plurality of images has global signatures that correspond to the generated plurality of global signatures that are retained in the data repository, wherein each type of global signature is assigned a weight;

comparing each of the plurality of generated global signatures with corresponding global signatures retained in the data repository, wherein the comparing takes into consideration weights assigned to each type of global signature; and identifying the subset of images from the plurality of images based at least in part upon the comparing of each of the plurality of generated global signatures with the corresponding global signatures retained in the data repository.

9. The method of claim 8, further comprising:

automatically assigning weights to each of the types of global signature.

10. The method of claim 9, wherein automatically assigning weights to each of the types of global signature comprises:

locating a threshold number of images that most closely match the image using first weights assigned to the types of global signatures;

reviewing known correlations between images in the threshold number of images to ascertain whether the images in the threshold number of images were properly selected; and modifying the weights based at least in part upon the reviewing of the known correlations.

11. The method of claim 1 configured for execution in a mobile robotic device.

12. The method of claim 1, further comprising:

causing a robotic device to move in a particular direction based at least in part upon the first image most closely matching the image.

13. A system comprising the following computer-executable components:

a receiver component that receives a first image;

a symmetry signature generator component that generates a first global symmetry signature for the image, wherein the global symmetry signature is representative of symmetry existent in the first image;

a comparer component that performs a first comparison of the first global symmetry signature with a plurality of global symmetry signatures that correspond to a respective plurality of images, wherein the plurality of global symmetry signatures are respectively representative of symmetries existent in the plurality of images, wherein the comparer component identifies a subset of images in the plurality of images based at least in part upon the first comparison, wherein a number of images in the subset of images is less than a number of images in the plurality of images, and wherein the comparer component, subsequent to identifying the subset of images, performs a second comparison of a first plurality of features of the first image with features that respectively correspond to the subset of images and identifies a second image from the subset of images that most closely matches the first image based upon the second comparison, wherein a feature is representative of a portion of a respective image; and an output component that outputs an indication of similarity between the first image and the second image.

14. The system of claim 13, further comprising a controller component that controls motion of a robotic device based at least in part upon the indication of similarity output by the output component.

15. The system of claim 13, further comprising:

a feature extractor component that extracts the first plurality of features from the first image.

16. The system of claim 15, further comprising:

a feature signature generator component that generates a first feature signature for the first image, wherein the first feature signature for the first image is based at least in part upon the first plurality of features extracted from the first image, wherein the comparer component undertakes a third comparison between the first feature signature and feature signatures that respectively correspond to the plurality of images, and wherein the output component outputs the indication of similarity between the first image and the second image based at least in part upon the third comparison.

17. The system of claim 13, further comprising:

a color global signature generator component that generates a first color global signature for the first image, wherein the first color global signature is representative of color existent in the first image, wherein the comparer component undertakes a third comparison between the first color global signature for the first image and global signatures that respectively correspond to the plurality of images, wherein the output component outputs the indication of similarity between the first image and the second image based at least in part upon the third comparison.

18. A computing device comprising a computer-readable medium, the computer-readable medium comprising instructions that, when executed by a processor, cause the processor to perform acts comprising:

receiving a first image;

responsive to receiving the first image, generating a first plurality of features for the first image, wherein a feature is representative of a portion of an image;

generating a first global signature for the first image, wherein the first global signature is representative of an entirety of the first image, wherein the first global signature is based at least in part upon the first plurality of features;

generating a second global signature for the first image, wherein the second global signature is representative of the entirety of the first image, wherein the second global signature is based at least in part upon symmetries in the first image;

generating a third global signature for the first image, wherein the third global signature is representative of the entirety of the first image, wherein the third global signature is based at least in part upon colors existent in the first image;

accessing a data repository that comprises data respectively corresponding to a plurality of images, wherein data for each image comprises features and global signatures that respectively correspond to the plurality of images;

comparing the first, second, and third global signatures with respective global signatures in the data repository that correspond to the plurality of images;

selecting a subset of the plurality of images based at least in part upon the comparing of the first, second, and third global signatures with the respective global signatures in the data repository, wherein a number of images in the subset of images is less than a number of images in the plurality of images;

comparing the features of the first image with features that respectively correspond to images in the subset of images; and outputting a second image that most closely matches the first image based at least in part upon the comparing of the features of the first image with the features that respectively correspond to the subset of images.

19. The computing device of claim 18 being a mobile robotic device.

20. The computing device of claim 19, the acts further comprising:

controlling movement of the mobile robotic device based at least in part upon the second image most closely matching the first image.

\* \* \* \* \*